(12) United States Patent
Veerasamy

(10) Patent No.: US 8,638,487 B2
(45) Date of Patent: Jan. 28, 2014

(54) ELECTROCHROMIC DEVICES, ASSEMBLIES INCORPORATING ELECTROCHROMIC DEVICES, AND/OR METHODS OF MAKING THE SAME

(71) Applicant: Guardian Industries Corp., Auburn Hills, MI (US)

(72) Inventor: Vijayen S. Veerasamy, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 13/621,310

(22) Filed: Sep. 17, 2012

(65) Prior Publication Data

US 2013/0016417 A1      Jan. 17, 2013

Related U.S. Application Data

(62) Division of application No. 12/805,144, filed on Jul. 14, 2010, now Pat. No. 8,289,610.

(60) Provisional application No. 61/237,580, filed on Aug. 27, 2009.

(51) Int. Cl.
    *G02F 1/15*       (2006.01)
    *G02F 1/153*      (2006.01)

(52) U.S. Cl.
    USPC .......................................... 359/265; 359/275

(58) Field of Classification Search
    CPC ............ G02F 1/15; G02F 1/153; B32B 17/10
    USPC .................................. 359/265, 273, 274, 275
    See application file for complete search history.

(56) References Cited

U.S. PATENT DOCUMENTS

| | | |
|---|---|---|
| 5,253,101 A | 10/1993 | Demiryont |
| 6,178,034 B1 | 1/2001 | Allemand et al. |
| 6,337,758 B1 * | 1/2002 | Beteille et al. ................ 359/265 |
| 6,842,276 B2 | 1/2005 | Poll et al. |
| 7,190,506 B1 | 3/2007 | Berneth et al. |
| 7,198,851 B2 | 4/2007 | Lemmer et al. |
| 7,217,461 B2 | 5/2007 | Ferreira et al. |
| 7,229,533 B2 | 6/2007 | Veerasamy |
| 7,271,460 B2 | 9/2007 | Nagasaka et al. |
| 7,300,701 B2 | 11/2007 | Lingle |
| 7,311,975 B2 | 12/2007 | Butz et al. |

(Continued)

FOREIGN PATENT DOCUMENTS

| | | |
|---|---|---|
| DE | 101 18 617 | 11/2002 |
| DE | 10 2006 042 538 | 3/2008 |

(Continued)

OTHER PUBLICATIONS

U.S. Appl. No. 12/805,144, filed Jul. 14, 2012; Veerasamy.

(Continued)

*Primary Examiner* — David N Spector
(74) *Attorney, Agent, or Firm* — Nixon & Vanderhye P.C.

(57) ABSTRACT

Certain example embodiments of this invention relate to electrochromic (EC) devices, assemblies incorporating electrochromic devices, and/or methods of making the same. More particularly, certain example embodiments of this invention relate to improved EC materials, EC device stacks, high-volume manufacturing (HVM) compatible process integration schemes, and/or high-throughput low cost deposition sources, equipment, and factories.

20 Claims, 4 Drawing Sheets

(56) References Cited

U.S. PATENT DOCUMENTS

| | | | |
|---|---|---|---|
| 7,314,668 | B2 | 1/2008 | Lingle et al. |
| 7,344,782 | B2 | 3/2008 | Lingle et al. |
| 7,375,871 | B2 | 5/2008 | Libretto et al. |
| 7,411,716 | B2 | 8/2008 | Oh et al. |
| 7,419,725 | B2 | 9/2008 | Neuman et al. |
| 7,450,294 | B2 | 11/2008 | Weidner |
| 7,455,910 | B2 | 11/2008 | Stachowiak |
| 7,511,872 | B2 | 3/2009 | Tonar et al. |
| 7,525,714 | B2 | 4/2009 | Poll et al. |
| 7,537,677 | B2 | 5/2009 | Lu et al. |
| 7,545,551 | B2 | 6/2009 | Yoshimura et al. |
| 7,547,658 | B2 | 6/2009 | Liu et al. |
| 8,289,610 | B2 | 10/2012 | Veerasamy |
| 2005/0100721 | A1 | 5/2005 | Dzick |
| 2006/0169316 | A1 | 8/2006 | Thomsen et al. |
| 2006/0249199 | A1 | 11/2006 | Thomsen et al. |
| 2007/0076286 | A1* | 4/2007 | Sung et al. ............ 359/265 |
| 2007/0215205 | A1 | 9/2007 | Thomsen et al. |
| 2009/0217978 | A1 | 9/2009 | Thomsen et al. |
| 2009/0223252 | A1 | 9/2009 | Fulton et al. |
| 2009/0323162 | A1 | 12/2009 | Fanton et al. |
| 2010/0122728 | A1 | 5/2010 | Fulton et al. |

FOREIGN PATENT DOCUMENTS

| | | |
|---|---|---|
| EP | 1 986 043 | 10/2008 |
| FR | 2 669 325 | 5/1992 |
| FR | 2 781 084 | 1/2000 |
| FR | 2 873 460 | 1/2006 |
| JP | 58-209721 | 12/1983 |
| JP | 09-171188 | 6/1997 |
| JP | 2003-156724 | 5/2003 |
| JP | 2004-505298 | 2/2004 |
| JP | 2005-504344 | 2/2005 |
| JP | 2005-170034 | 6/2005 |
| JP | 2007-187993 | 7/2007 |
| WO | WO 02/08826 | 1/2002 |
| WO | WO 03/027762 | 4/2003 |
| WO | WO 2008/012461 | 1/2008 |
| WO | WO 2008/055824 | 5/2008 |

OTHER PUBLICATIONS

International Search Report dated Mar. 2, 2011 for PCT/US2010/002331).
Partial International Search Report mailed Dec. 1, 2010 for PCT/US2010/002331).
U.S. Appl. No. 12/805,145, filed Jul. 14, 2010; Veerasamy.
U.S. Appl. No. 12/385,318, Fulton, filed Apr. 3, 2009.
U.S. Appl. No. 12/461,349, Veerasamy, filed Aug. 7 2009.
U.S. Appl. No. 12/659,352, Veerasamy, filed Mar. 4, 2010.
"Curbing Global Energy Demand Growth: The Energy Productivity Opportunity," McKinsey & Company, McKinsey Global Institute, May 2007.
"Advancement of Electrochromic Windows," Pier Final Project Report, Lawrence Berkeley National Laboratory, CEC-500-2006-052Apr. 2006.
Eleanor S. Lee, et al., "Monitored Energy Performance of Electrochromic Windows Controlled for Daylight and Visual Comfort," Lawrence Berkeley National Laboratory, LBNL-58912, Jun. 2006, pp. 1-23.
Eleanor S. Lee, et al., "The Energy-Savings Potential of Electrochromic Windows in the US Commercial Buildings Sector," Lawrence Berkeley National Laboratory, LBNL-54966, Apr. 30, 2004, pp. 1-42.
Eleanor S. Lee, et al., "Daylight Control Performance of a Thin-Film Ceramic Electrochromic Window: Field Study Results," Lawrence Berkeley National Laboratory, LBNL-54924, Feb. 15, 2005, pp. 1-19.
Eleanor S. Lee, et al., "Application Issues for Large-Area Electrochromic Windows in Commercial Buildings," Lawrence Berkeley National Laboratory, LBNL-45841, May 2000, pp. 1-24.
Joshua Apte, et al., "Window-Related Energy Consumption in the US Residential and Commercial Building Stock," Lawrence Berkeley National Laboratory, LBNL-60146, pp. 1-38.
"Energy Research at DOE: Was It Worth It? Energy Efficiency and Fossil Energy Research 1978 to 2000," Committee on Benefits of Doe R&D on Energy Efficiency and Fossil Energy, Board on Energy and Environmental Systems, Division on Engineering and Physical Sciences, National Research Council, ISBN: 0-309-07448-7, 2001.

\* cited by examiner

ELECTROCHROMIC DEVICES, ASSEMBLIES INCORPORATING ELECTROCHROMIC DEVICES, AND/OR METHODS OF MAKING THE SAME

CROSS-REFERENCE TO RELATED APPLICATION

This application is a divisional of application Ser. No. 12/805,144, filed Jul. 14, 2010, which claims priority on Provisional Ser. No. 61/237,580 filed Aug. 27, 2009, the entire disclosures of which are all hereby incorporated herein by reference in this application.

FIELD OF THE INVENTION

Certain example embodiments of this invention relate to electrochromic (EC) devices, assemblies incorporating electrochromic devices, and/or methods of making the same. More particularly, certain example embodiments of this invention relate to improved EC materials, EC device stacks, high-volume manufacturing (HVM) compatible process integration schemes, and/or high-throughput low cost deposition sources, equipment, and factories.

BACKGROUND AND SUMMARY OF EXAMPLE EMBODIMENTS OF THE INVENTION

Windows provide natural light, fresh air, access, and connection to the outside world. However, they also represent a significant source of wasted energy. With the growing trend in increasing the use of architectural windows, balancing the conflicting interests of energy efficiency and human comfort is becoming more and more important. Furthermore, the concerns with global warming and carbon foot-prints are adding to the impetus for novel energy efficient glazing systems.

In this regard, windows are unique elements in most buildings in that they have the ability to "supply" energy to the building in the form of winter solar gain and daylight year around. In current applications, they are responsible for about 5% of the entire U.S. energy consumption, or about 12% of all energy used in buildings. Current window technology often leads to excessive heating costs in winter, excessive cooling in summer, and often fails to capture the benefits of daylight, that would allow lights to be dimmed or turned off in much of the nation's commercial stock. These factors result in an energy "cost" of over 5 Quads: 2.7 Quads of energy use annually in homes, about 1.5 Quads in the commercial sector, and another 1 Quad of potential lighting energy savings with daylight strategies. Advances have been made over the last two decades primarily in reducing the U-value of windows through the use of static low-E coatings, and by reducing the solar heat gain coefficient, SHGC, via the use of spectrally selective low e coatings. However, further enhancements are still possible.

With the ability to dynamically control solar heat gain, loss, and glare without blocking the view, electrochromic windows (ECWs) may provide a significant reduction in energy use. Indeed, ECWs have the potential to impact all the window energy end uses, e.g., by reducing cooling loads in climates where windows contribute to substantial cooling loads while allowing the same window to admit solar gain in winter to reduce heating, and modulating daylight to allow electric lighting to be reduced in commercial buildings while also controlling glare. For example, as the exterior light and heat levels change, the performance of the window can be automatically adjusted to suit conditions via an automated feedback control.

Electrochromic (EC) windows are known. See, for example, U.S. Pat. Nos. 7,547,658; 7,545,551; 7,525,714; 7,511,872; 7,450,294; 7,411,716; 7,375,871; and 7,190,506, the disclosure of each of which is incorporated herein by reference.

Some current EC dynamic windows provide transmissions ranging from about 3% in the tinted state to about 70% in the clear state. As indicated above, the solar heat gain control (SHGC) range is quite large. Indeed, some current EC dynamic windows provide an SHGC range from about 0.09 in the tinted to about 0.48 in the clear state. Lithium based-inorganic EC technology also offers the advantages of durability, low voltage (less than about 5V) operation, clarity (70%), transparency when power is off, and low energy consumption. Despite these broad ranges, current lithium-based inorganic ECWs unfortunately offer limited color variation, and maximum opacity could be improved (e.g., relative to other switchable glazing types). Another drawback with current lithium-based inorganic ECWs relates to their slow switching times. Indeed, current switching times for lithium-based inorganic ECWs typically range from about 5-10 minutes. Proton-based inorganic and organic polymer device mechanisms switch somewhat faster (e.g., 15 seconds to 5 minutes) but unfortunately suffer from degradation of the ionic conductor in the former case and degradation of the polymer in the latter case. The operational voltage for lithium based inorganic as well as proton-based inorganic and organic polymer type EC devices typically operate with 1-5 V DC and typically consume 2-3 $W/m^2$ when switching and 0.5-1 $W/m^2$ while maintaining the tinted state.

FIG. 1(a) is a schematic diagram of a typical electrochromic window, and FIG. 1(b) is a schematic diagram of a typical electrochromic window in a tinted or colored state. The active stack 100 shown in FIG. 1(a) includes four components, namely, first and second transparent current collectors 102 and 104; a cathode 106 (and often the coloration layer); an electrolyte 108 (which is ionically conducting but electrically insulating); and an anode 110, which is the source of the active ions (e.g. Li, Na, H, etc.) that switch the glazing properties upon transfer to and from cathode. The anode 110 may be a coloration layer, if coloration occurs anodically, e.g., as ions exit the layer. These components are sandwiched between first and second glass substrates 112 and 114. Fundamentally, the electrochromic device dynamically changes optical absorptivity, with the movement (intercalation and de-intercalation) of the Li into and out of the cathode 106. This, in turn, modulates the interaction with solar radiation thereby modulating the SHGC for energy control, as well as visibility and glare (important for human comfort). Because Li is in the cathode 106, the electrochromic window in a tinted or colored state and only a portion of incident light and heat are transmitted through the ECW.

Unfortunately, current ECW films do not meet the required performance in appearance (including color), switching speed, quality consistency, and long term reliability. Adequate supply and useful window sizes are additional issues.

One reason the current high ECW cost structure is above the market threshold is that the EC device fabrication is incompatible the fabrication flow of the glazing industry. One critical safety requirement in the building code is that the outermost glass in an insulated glass unit (IGU) be tempered. Also, according to practice in the coated glass industry, large sheets of glass (typically up to 3.2 m wide) are first coated, then sized, and finally tempered. In an ideal situation, the EC finished glass could be tempered and cut to size. However, tempered glass cannot be cut. Accordingly the practice in the coated glass industry is that large sheets of glass (typically up to 3.2 m wide) are first coated and then sold to the window fabrication sites where they are sized and tempered. Unfortunately, tempered glass cannot be cut afterwards, and the EC glass cannot be tempered after EC fabrication because the tempering temperatures would destroy the EC device. Consequently, current ECW fabrication techniques rely on already cut and tempered glass for EC fabrication. This is problematic for several reasons. For example, incoming tempered glass has a wide variation in thickness leading to substantial variation in the properties of the coating. Additionally, the presence of multiple substrate sizes and types leads to challenges in process control, throughput, and yield, which makes reproducible high yielding high volume manufacturing difficult.

FIG. 2 is a block diagram illustrating a current ECW fabrication process. The outermost glass is cut to size and tempered in 202, which corresponds to an EC glass fabrication process. The EC device is fabricated, e.g., so that it has the layer structure shown in FIG. 1(a), in 204. After the EC layers have been deposited, the EC device is patterned in 206, e.g., to reduce defects and improve yield and appearance. Bus bars are added to provide "electrification" (e.g., wiring) for the EC device in 208. A second substrate is added in spaced apart relation to the EC device, e.g., as shown in FIGS. 1(a) and 1(b). Together, 204, 206, 208, and 210 represent an insulating glass (IG) unit fabrication process. This IG unit may ultimately be incorporated into an ECW, e.g., as shown on the left-hand side of FIG. 1(b).

Another impediment to progress has been the limited resources and capabilities of the manufacturers in developing deposition sources, platforms, and automation that are compatible with high-throughput large-scale manufacturing techniques.

The most practical place to have the EC coating is on the inner surface of the outermost lite. The placement of bus bars on this surface for electrification (e.g., wiring) presents challenges not only to current IG fabricators, but also to glazers. Architects, commercial building owners, and end-users require information about the durability of the EC window over long durations of time. The reliability of the IG unit seal therefore is a concern. The EC IG unit differs from conventional windows in that interconnections to power the device must pass through the moisture barrier seal. There are no standards for interconnects and feed-throughs that preserve the seal integrity. What is on the market is proprietary. There are also concerns about the durability of the EC film stack when exposed to the range of solar and environmental stresses that a window experiences over its lifetime.

Finally, the device performance in terms of appearance, color, switching speed, consistency, SHGC range, and lifetime needs consideration. For example, architects have a strong preference for a neutral colored window that switches from dark gray to perfectly clear. Most EC windows on the market today exhibit a dark blue hue when colored and a yellowish tinge in the clear state. A more neutral color and enhanced transmission in the clear state would broaden the accessible architectural market.

Thus, it will be appreciated that there is a need in the art for improved electrochromic dynamic windows, and/or methods of making the same. For example, it will be appreciated that there is a need in the art for (1) low cost, large scale, high throughput coating techniques that are compatible with high-volume manufacturing (HVM); (2) a better performing EC formulation; (3) a robust, high throughput, low defect EC formation for large-size lites; and/or (4) coupling such new manufacturing techniques with existing post-glass fabrication and the ancillary technologies for producing complete windows. These and/or other techniques may help solve some of the above-noted and/or other problems, while also providing for more complete building control integration.

Certain example embodiments relate to top-down and/or bottom-up changes to (a) materials, (b) the electrochromic device stack, (c) high volume compatible process integration schemes, and (d) high throughput, low cost deposition techniques and equipment. In so doing, certain example embodiments may be used to provide reduced cost EC assemblies, en route to "Net-Zero Energy Buildings."

One aspect of certain example embodiments involves the incorporation of novel electrochromic materials. For example, certain example embodiments involve an optically doped cathode and/or anode for greater visible transmission in the clear state, greater solar heat gain control (SHGC) delta between these states, improved appearance, and better reliability. Controlling the stoichiometry of $WO_x$ (e.g., so that it is sub-stoichiometric) advantageously may result in improvements with respect to the SHGC delta and better appearance (e.g., in terms of coloration). Anodically coloring the counter electrode also may increase the SHGC delta.

Another aspect of certain example embodiments involves the incorporation of a novel electrochromic device stack. For example, the inclusion of a low-cost, low-Fe mid-lite substrate may help reduce the need for substrate-device barrier layers. An improved transparent current collector (TCC) with much higher conductivity and transmittance than ITO may be provided for increased switching speed and reduced cost. The inclusion of a lithium phosphorus oxynitride (LiPON) electrolyte material may be selected for reliability purposes in certain example embodiments. Additionally, the use of transparent dielectric/conductive layers may be used to shift the color based on selective interference in certain example embodiments.

Still another aspect of certain example embodiments involves novel techniques for electrochromic device integration. For example, certain example embodiments may involve the use of laminated/bonded glass for the outer lite of EC IG unit. This may advantageously result in the complete elimination of the use of tempered glass in EC fabrication step, reduce the need for glass sizing and tempering before EC processing, enable the use of a single standard type and sized glass in EC fabrication for best process reproducibility and economy of scale, and/or enable post-EC fabrication sizing of glass. It also may advantageously enable device patterning after all EC layers have been deposited, thereby reducing the likelihood of defects and improving yield and appearance.

Yet another aspect of certain example embodiments relates to HVM-compatible deposition source development. For example, a novel LiPON deposition source capable of achieving high deposition rates and modulating growth kinetics may, in turn, enable high throughput and better film characteristics in certain example embodiments. Certain example embodiments also may use a novel linear showerhead based Li evaporator with remote, normal ambient compatible Li sources.

In certain example embodiments, a method of making electrochromic windows is provided. A first glass substrate is provided. Electrochromic device layers are disposed on the first substrate, with such layers comprising at least counter electrode (CE), ion conductor (IC), and electrochromic (EC) layers. The electrochromic device layers are patterned, and the first glass substrate with the electrochromic device layers disposed thereon is cut so as to form a plurality of EC device substrates. A plurality of second glass substrates is provided. The plurality of EC device substrates is bonded or laminated to the plurality of second glass substrates, respectively. A plurality of third glass substrates is provided. A plurality of insulating glass (IG) units is formed, respectively comprising first and second substrates in substantially parallel, spaced apart relation to the third glass substrates.

In certain example embodiments, a method of making an electrochromic (EC) assembly is provided. First, second, and third glass substrates are provided, wherein the second substrate is thermally tempered and the first substrate is not thermally tempered. A plurality of EC device layers are sputtering-deposited, directly or indirectly, on the first substrate, with the plurality of EC device layers comprising a first transparent conductive coating (TCC), a counter electrode (CE) layer, ion conductor (IC) layer, an EC layer, and a second TCC. The first and second substrates are laminated or bonded to one another. The second and third substrates are provided in substantially parallel and spaced apart relation to one another. The CE and EC layers are both color changeable when the EC assembly is in operation.

In certain example embodiments, a method of making an electrochromic (EC) assembly is provided. A plurality of EC device layers are sputtering-deposited, directly or indirectly, on a first substrate, with the plurality of device layers comprising, in order moving away from the first substrate, a first transparent conductive coating (TCC), a cathode layer, an electrolyte layer, an anodically coloring anode layer, and a second TCC. The first substrate with the plurality of device layers sputter-deposited thereon is connected to a second substrate such that the first and second substrates are in substantially parallel and spaced apart relation to one another.

In certain example embodiments, an electrochromic (EC) assembly is provided. First, second, and third glass substrates are provided, with the second and third substrates being substantially parallel to and spaced apart from one another. A plurality of sputter deposited EC device layers are supported by the first substrate, with the plurality of EC device layers comprising a first transparent conductive coating (TCC), a counter electrode (CE) layer, ion conductor (IC) layer, an EC layer, and a second TCC. The first and second substrates are laminated or bonded to one another. The second substrate is thermally tempered and the first substrate is not thermally tempered.

In certain example embodiments, an electrochromic (EC) assembly is provided. At least first and second glass substrates are provided, with the first and second substrates being substantially parallel to and spaced apart from one another. A plurality of sputter deposited device layers are supported by the first substrate, with the plurality of EC device layers comprising a first transparent conductive coating (TCC), a doped and anodically coloring counter electrode (CE) layer, an ion conductor (IC) layer, a doped EC layer comprising WOx, and a second TCC.

In certain example embodiments, an electrochromic device including a plurality of thin-film layers supported by a first substrate is provided. The plurality of layers comprises a doped and anodically coloring anode layer; an electrolyte layer comprising Li; and a doped cathode layer comprising WOx.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1A:
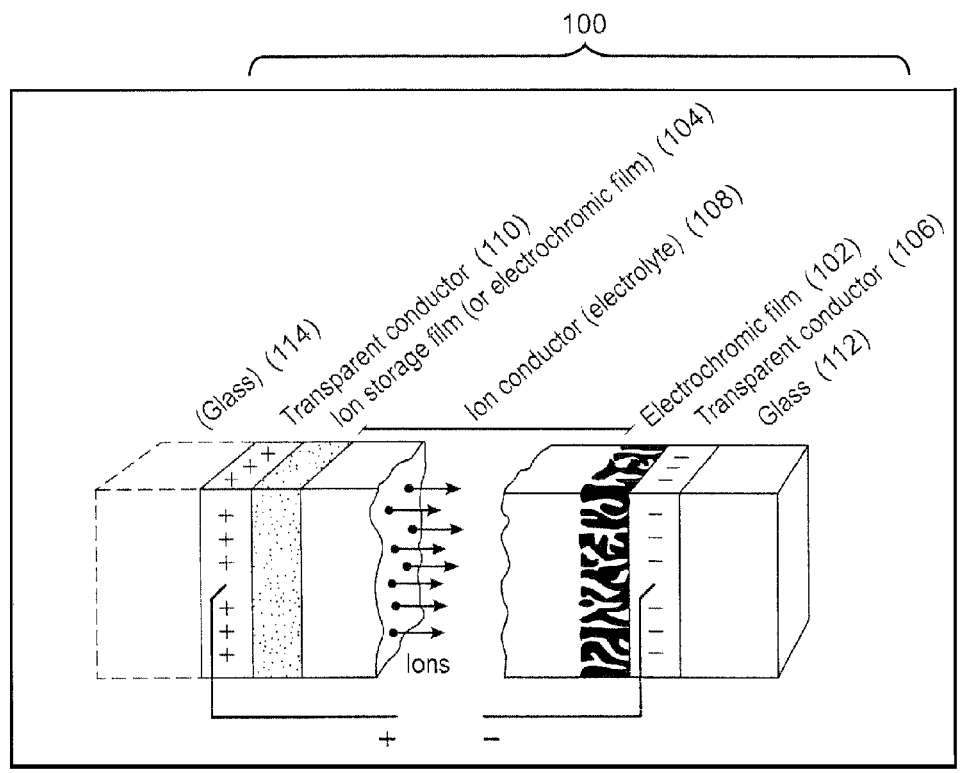
FIG. 1(a) is a schematic diagram of a typical electrochromic window.
Figure 1B:
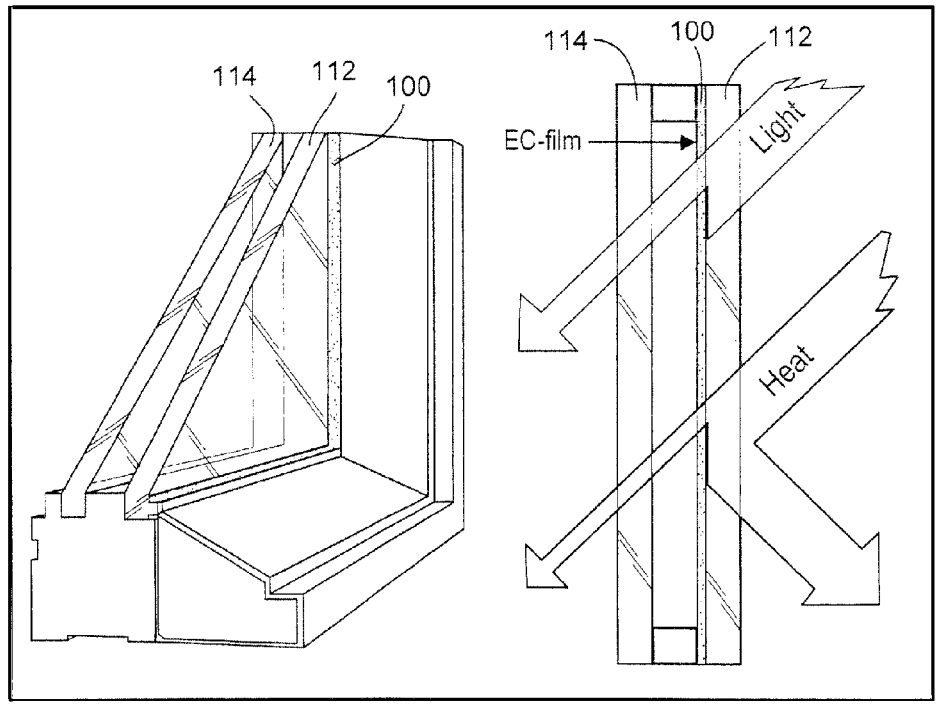
FIG. 1(b) is a schematic diagram of a typical electrochromic window in a tinted or colored state.

One aspect of certain example embodiments involves the incorporation of novel electrochromic materials. For example, certain example embodiments involve an optically doped cathode and/or anode for greater visible transmission in the clear state, greater solar heat gain control (SHGC) delta between these states, improved appearance, and better reliability. Controlling the stoichiometry of $WO_x$ (e.g., so that it is sub-stoichiometric) advantageously may result in improvements with respect to the SHGC delta and better appearance (e.g., in terms of coloration). Anodically coloring the counter electrode also may increase the SHGC delta.

Another aspect of certain example embodiments involves the incorporation of a novel electrochromic device stack. For example, the inclusion of a low-cost, low-Fe mid-lite substrate may help reduce the need for substrate-device barrier layers. An improved transparent current collector (TCC) with much higher conductivity and transmittance than ITO may be provided for increased switching speed and reduced cost. The inclusion of a lithium phosphorus oxynitride (LiPON) electrolyte material may be selected for reliability purposes in certain example embodiments. Additionally, the use of transparent dielectric/conductive layers may be used to shift the color based on selective interference in certain example embodiments.

Still another aspect of certain example embodiments involves novel techniques for electrochromic device integration. For example, certain example embodiments may involve the use of laminated/bonded glass for the outer lite of EC IG unit. This may advantageously result in the complete elimination of the use of tempered glass in EC fabrication step, reduce the need for glass sizing and tempering before EC processing, enable the use of a single standard type and sized glass in EC fabrication for best process reproducibility and economy of scale, and/or enable post-EC fabrication sizing of glass. It also may advantageously enable device patterning after all EC layers have been deposited, thereby reducing the likelihood of defects and improving yield and appearance.

Yet another aspect of certain example embodiments relates to HVM-compatible deposition source development. For example, a novel LiPON deposition source capable of achieving high deposition rates and modulating growth kinetics may, in turn, enable high throughput and better film characteristics in certain example embodiments. Certain example embodiments also may use a novel linear showerhead based Li evaporator with remote, normal ambient compatible Li sources.

Certain example embodiments involve changes to EC materials, the EC device stack, HVM compatible process integration schemes, and/or high-throughput low cost deposition sources, equipment, and factories. These aspects of certain example embodiments are discussed, in turn, below.

Certain example embodiments relate to advantages in terms of one or more of cost, device performance, durability, aesthetics, and/or scalability. For example, some current electrochromic products cost more than $50/sq. ft., whereas the techniques of certain example embodiments may provide electrochromic products at a cost that preferably is less than $25/sq. ft., more preferably less than $20/sq. ft., and still more preferably less than $15/sq. ft. Although it is difficult to run wiring and control infrastructure for current products, certain example embodiments may provide for relatively simple modular products, with wireless powering and/or control options. Although many current products can achieve a switching speed of 3-5 minutes at best, certain example embodiments may provide a switching speed of less than 3 minutes, more preferably less than 2 minutes, and sometimes even less than 1 minute, even though the overall product size may be increased. Advantageously, delta E may be less than about 1.5, more preferably less than about 1.25, and still more preferably less than about 1. In terms of color/hue, certain example embodiments may reduce the yellowish hue in the clear state and the multiple colors that sometimes are present in the tinted state, instead providing a more neutral color in the clear state with a choice from one of multiple colors in the tinted state. Furthermore, certain example embodiments may reduce switching uniformity problems, e.g., by causing the latitude to at least appear to change "all at once" (at least as compared to the variability in shade lines and individual controls in current systems). Finally, although current EC devices generally are limited to 1 m wide designs, certain example embodiments may scale up to 3.2 m wide (or even wider) designs so as to be in-line with commonly available stock glass sheets.

Example Fabrication Processes

Figure 2:
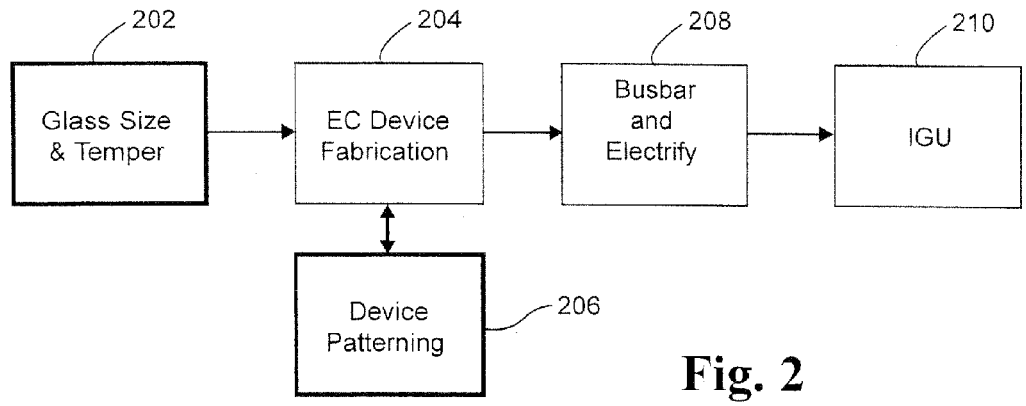
FIG. 2 is a block diagram illustrating a current ECW fabrication process.
Figure 3:
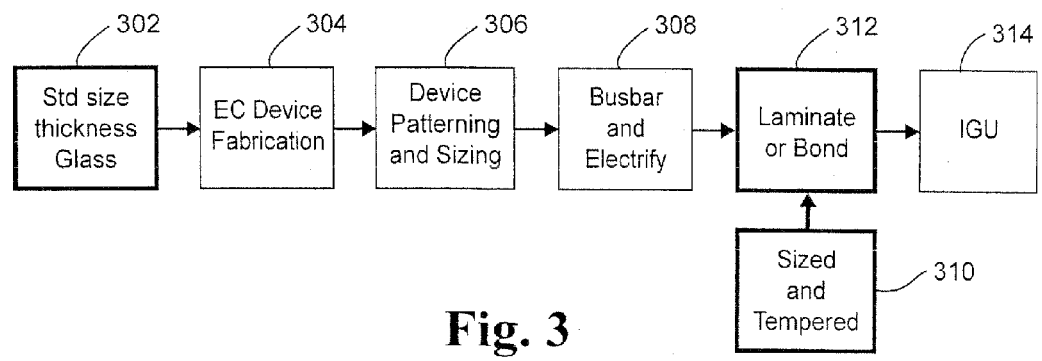
FIG. 3 is a block diagram illustrating an ECW fabrication process in accordance with an example embodiment.

FIG. 3 is a block diagram illustrating an ECW fabrication process in accordance with an example embodiment. The FIG. 3 process differs from the FIG. 2 process in several ways, owing to the fact that the FIG. 3 process is designed to provide an EC device on an EC substrate that may be bonded, laminated, or otherwise connected to a temperable substrate. For example, a material such as PVB, EVA, or the like may be used, as may "optibond technology," which is commercially available from Litemax. The laminate that is used may incorporate a UV blocker (e.g., a UVA blocker). Preferably, a UVA blocker may be included, with Tuv<1%, more preferably <0.75%, and still more preferably <0.5%. The UV blocker may a thin film coating comprising one or more of Bi, BiO, Zn, ZnO, TiO, BiSnO, AgO, Ce, CeO, and/or the like. Alternatively, or in addition, a PET coating may be provided, with a UV blocking material provided thereon and/or therein. It will be appreciated PET layer may be provided in certain example embodiments. It will be appreciated that organic and/or inorganic materials may be used in connection with certain example embodiments. In any event, the laminate may be selected so that its refractive index matches with the adjacent layers and/or substrates. This advantageously will help keep reflectance low. Reflectance also may be lowered, e.g., by incorporation of one or more anti-reflective (AR) layers. Because the EC device is provided on a separate substrate that may be later bonded, laminated, or otherwise connected to a temperable substrate, efficiencies can be realized, e.g., in that larger sheets can be sputter-coated or the like and later cut to size. Example structural details are provided below.

In terms of the example process shown in FIG. 3, large size glass is provided in 302. An EC device is fabricated according to the example techniques described below in 304. Device patterning and sizing is carried out in 306, thereby forming a plurality of EC devices on a plurality of corresponding EC substrates. As indicated above, this is an advantage over the conventional process shown in FIG. 2, where individual EC devices are fabricated directly on individually pre-cut individually already-tempered substrates. In any event, bus bars are connected and the EC device is "electrified" (e.g., wired) in 308. The bus bars may be formed by selectively laser etching away layers to carefully expose the TCC. For example, to selectively etch and electrically connect the device, both "full" and "half" cuts may be made, e.g., to expose the bottom and top TCCs. The laser power may be controlled to selectively remove some or all of the layers in this manner.

In 310, the outer substrate to which the EC device and substrate is to be connected is sized and tempered. Then, in 310, the appropriately sized EC devices are laminated, bonded, or otherwise connected to the appropriately sized outer substrates. The sub-assemblies comprising the EC devices laminated, bonded, or otherwise connected to the outer substrates are then build into corresponding insulating glass (IG) units in 314, e.g., as described in greater detail below.

Example Electrochromic Stack, and Example Materials Used Therein

Figure 4:
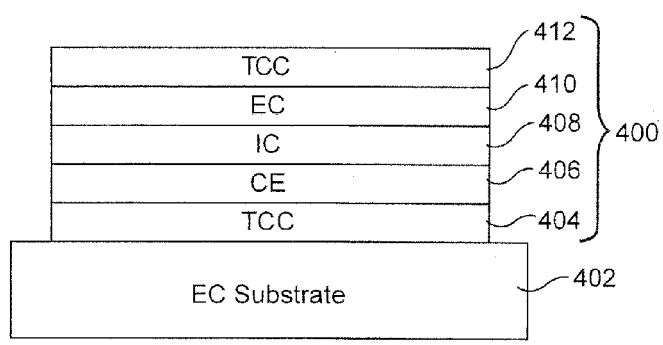
FIG. 4 is an illustrative electrochromic substrate and stack in accordance with an example embodiment.

FIG. 4 is an illustrative electrochromic substrate and stack in accordance with an example embodiment. FIG. 4 incorporates an electrochromic stack 400 that is somewhat similar to known electrochromic stacks in that it incorporates conductive layers (TCCs), an electrochromic (EC) layer, a counter electrode (CE) layer, and an ion conductor (IC) layer. However, the FIG. 4 electrochromic stack 400 differs from current stacks in terms of materials, overall stack design, and performance characteristics. For example, thermal performance, EC speed, long-term EC reliability, and aesthetics may be improved, e.g., optimize the performance of known materials and develop new material systems that further improve performance of the overall EC device. The changes to the materials and stack designs are described in the paragraphs that follow.

A first area of innovation involves the cathode/EC and anode/CE electrode materials. The thermal performance of an ECW is related to the range of SHGC between clear and tinted states. To increase the SHGC range, the absorptivity of either or both of the cathode and anode layers may be reduced in the clear state, and/or an anodically coloring counter electrode may be created to lower the transmission ($T_v$) in the colored state. The appropriate material selection may also increase reliability and switching speed.

These and/or other aspects may be accomplished by the substitutional doping of active electrode materials in certain example embodiments. A counter electrode typically includes NiO, with Li+ or H+ ions. As described above, improving thermal performance, lowering absorbance, and improving reliability and stability of conductive electrode CE are advantageous. By using additives such Mg, Al, Si, Zr, Nb and Ta, a significant reduction of EC and CE film absorbance may be achieved, especially at short wavelengths. On the other hand, films containing V and Ag have not show the same improvements in optical properties compared to those of pure nickel oxide. As such, Mg and/or other element incorporation, in a combinatorial fashion, may be used to optimize its beneficial effect in both NiO and LiNiO systems for widening the band gap and improving the transmittance substantially. Alternatively, or in addition, the inclusion of W into the LiNiO also is possible in certain example embodiments, and it may be used to improve the stability as a CE layer to UV radiation and moisture. This and/or other substitutional doping may be used to increase electrical conductivity (in some cases by 3 orders of magnitude, e.g., $LiCoO_2$ vs. $LiCo_{0.95}Mg_{0.05}O_2$). Surprisingly and unexpectedly, doping the CE (and/or the IC) with Mg also makes it a "faster" conductor.

certain example embodiments also may involve anodically coloring the counter electrode, e.g., for improved thermal performance. As is known, the CE is used to store the charge, which is in turn used to color the electrochromic layer. To do this effectively, the CE layer may allow charges to intercalate easily; be stable and durable to repeated cycling; and be very transparent in the clear state; and if possible, display electrochromism when fully discharged of intercalated ions (e.g., anodically). Thus, in certain example embodiments, the CE may be made electrochromic. However, in such example embodiments, the CE may be the "reverse" of the EC layer, e.g., such that it becomes transparent with ions, and provides for a color change on ion loss. To realize these and/or other features, certain example embodiments may incorporate a CE based on NiO systems that have been shown to be stable upon repeated charge insertion/extraction cycling. These systems sometimes display a small amount of residual absorption when the device is fully intercalated, e.g., in $Li_xNiO_{(1+y)}$ state in the reaction shown below. The challenge is to remove this absorption without sacrificing the wide dynamic range and good switching kinetics of the device. The substitutional doping, analogous to the discussion in previous section, using Li may induce better $T_v$ and remedy the small absorbance that is counter to increasing the SHGC delta.

The tendency for water to cause deterioration in $NiO_{(1+y)}$ hydrated systems has now been confirmed. Consequently, non-aqueous based electrolytes and the cubic form of lithium nickel oxide may be a promising electrochromic system in certain example embodiments. For example, nanocrystalline $Li_xNi_{1-x}O$ may have a wide optical dynamic range and more neutral color than tungsten oxide, as well as better stability. Furthermore, may be anodically coloring, thereby providing the advantage of being complementary to cathodic tungsten oxide. A combination of these materials may be favorable with regard to electrochemical potentials, and as well as attaining a neutral deeper color in the dark state. The photopic coloration efficiency of this anodically coloring material typically is high. The switching performance of a device utilizing a solid state electrolyte as well as a lithium nickel oxide film as counter electrode and a tungsten oxide electrochromic film has certain advantages over currently available systems. It is noted that the main reaction at the basis of this electrochromic activity is:

$$NiO_{(1+y)} + (Li^+ + e) \rightarrow Li_xNiO_{(1+y)}$$

Dark → Colorless

In certain example embodiments, the absorptivity and/or color modulation of the EC tungsten oxide (WOx) may be altered for thermal performance and appearance. Stoichiometric $WO_3$ films are transparent for energies below the fundamental band gap at <3 eV. Li ion intercalation leads to electrochromism manifested by a broad absorption band centered at ~1.2 eV, which produces a distinctly blue color. This phenomenon may be described in terms of intervalence charge transfer with electrons transferred from a $W^{5+}$ site to an adjacent $W^{6+}$ site. The effects of polarons may be incorporated into a new model using tight binding approximation. According to this self-consistent model, the value of x in slightly sub-stoichiometric $WO_x$ can be optimized in certain example embodiments so that the EC material is yet more transparent and, upon increased lithiation, increases absorptivity. The sub-stoichiometric value of x preferably is $2.4<x<3$; more preferably $2.6<x<3$. A value of about 2.88 has been found to be particularly advantageous. Such values help reduce "yellowness" and improve the depth of color of the EC, which helps improve clear and colored states.

The strong electron-phonon coupling tends to favor the formation of $(W-W)^{10+}$ complexes, which do not lead to optical absorption. However, singly charged oxygen vacancies yield absorption because of inter-valence charge transfer. The analogy with data for the ion intercalated film is expected, as $W^{5+}$ sites are present in both cases. It thus appears that amorphous tungsten oxide films display a crossover from defects with paired electrons, according to the Anderson mechanism, and singly charged oxygen vacancies as the density of vacancies is increased.

Furthermore, irreversibility in the charge insertion is commonly found during the first color/bleach cycles, and the films remain transparent up to a threshold of inserted charge (called color blind charge) whereupon coloration sets in and subsequent cycles are reversible so that electrochromism prevails. The lithium is irreversibly incorporated and is not recovered from the EC film during switching. The blind charge does not seem to interfere with the electrochemical kinetics of the insertion process. However, the variable amount of irreversible Li incorporation makes it hard to precisely determine the amount of labile Li needed for optimal dynamic range of the EC device during switching. In addition, the Li loss is not uniform over large areas of film deposited. It therefore will be appreciated that the amount of blind charge resident in the as-deposited EC films may be controlled. One solution involves reducing (or minimizing) the amount of blind-charge present in the film by understanding the root cause of the Li "loss." One solution is related to the type of target used in the deposition of the EC material, the addition of an ion beam, and the monitoring of the process to judiciously control the stoichiometry of the films.

This solution reduces the need for heating of the substrate. In particular, in certain example embodiments, EC films with acceptable electrochromic properties may be deposited from ceramic targets using ion assisted twin magnetron configurations.

Indeed, certain example embodiments may employ substitutional doping and grain structure control to modulate the yellowish hue in the clear state. One concern for ECW is the yellowish baseline color in the clear state. The root causes are thought to be (1) the structural instability of metal oxide units ($WO_x$) with Li insertion/de-insertion cycles, leading to Jan-Teller distortion and corresponding shift in energy structure and color, (2) the base color of $NiO_x$ the most frequently used base anode material, and (3) interference related to grain boundaries. Doping with appropriate metals (V, Mo, etc., into $NiO_x$) and halides (e.g., Cl) may be used in certain example embodiments to address a least the first two root causes to change the band gap (and thus the varied light-material interaction) and/or to enhance the $WO_x$ structural stability over Li cycling. The grain structure may be modulated by deposition process optimization in certain example embodiments, either with in situ or post-deposition ex situ treatments (e.g., applying substrate bias and microwave enhancements or annealing). This also may be used to enhance the structural stability of $WO_x$ over Li cycling.

The IC helps to maintain internal electrical isolation between the EC and CE electrodes while providing ionic conductance for electrochromic behavior. The stability and reliability of electrochromism depends on the properties of the electrolyte. Lithium phosphorous oxynitride (LiPON) may be used as the electrolyte layer material in certain example. The choice is based on its superior reliability and stability, as demonstrated in the thin film battery applications. LiPON is an electrically insulating material (>1E14 Ω-cm), so RF sputtering is traditionally used and it exhibits a low deposition rate (<1 μm/hr). This low deposition rate may be improved as discussed below, and/or other materials and methods that are more amenable to high throughput production may be used in connection with certain example embodiments.

It will be appreciated that it would be advantageous to reduce the electronic leakage current taking place through the IC. The leakage current can be split into contributions that are associated with the thin film stack itself (diffusion limited), and that are associated with localized point defects, (both bulk and interfacial). One can model the EC/IC/sCE interfaces as heterojunctions. It is advantageous to stabilize the junction to subsequent thermal processing. The forward and reverse barrier heights for the EC/CE junction may be optimized by altering the composition, structure, and interface chemistry of the IC. The evidence suggests that leakage current may be reduced to negligible levels through selection of appropriate process and materials for the IC layer. Accordingly, certain example embodiments provide an IC layer where the integrity of the electron barrier structure is maintained with adequate ionic conductivity. In practice, higher ionic conductivity typically requires a more porous, amorphous structure, and possible incorporation of lithium, both of which may degrade the electron barrier functionality. The materials stack described herein, and the respective deposition processes described below, help alleviate these concerns. Furthermore, in certain example embodiments, the optical indices of the materials may be matched to the surrounding layers.

As shown in FIG. 4, the EC device stack 400 may include a first transparent conductive coating (TCC) 404, a counter electrode layer 406, an ion conductor layer 408, an electrochromic layer 410, and a second TCC 412. Each of the first and second TCCs 404 and 412 may be about 200 nm thick in certain example embodiments. An example layer system for one or both of the TCCs is provided below, e.g., in connection with FIG. 5. The anodic CE layer 406 may be about 100-400 nm thick, and it may include NiO and contain Li+ or H+ ions. A LiPON-based IC/electrolyte layer 408 may be about 1-3 microns. Similar to the CE layer 406, the EC layer 410 may be 100-400 nm thick. Either or both of the CE layer 406 and the EC layer 410 may be doped, e.g., to provide for better and/or deeper coloration. Optionally, a barrier layer (not shown in the FIG. 4 example) may be provided over the outermost TCC 412, and such a barrier layer may enable color shift. In certain example embodiments, the outermost TCC 412 itself may enable color shift. The EC device stack 400 is provided on an EC substrate 402 which may, in certain example embodiments, be provided as a standard size/thickness large substrate. Indeed, in certain example embodiments, the EC substrate 402 may be a low iron, non-tempered substrate that is cut after the EC device is fabricated on it. Example low-iron glass substrates are disclosed in, for example, U.S. application Ser. No. 12/385,318, as well as in U.S. Publication Nos. 2006/0169316; 2006/0249199; 2007/0215205; 2009/0223252; 2010/0122728; and 2009/0217978, the entire contents of each of which are hereby incorporated herein by reference.

The EC device stack design shown in FIG. 4 and described herein differs from current designs in a number of respects including, for example, the use of the novel transparent conductor described below, multiple dielectric layers for interferometric color shift, low Fe and low cost substrates on which the EC layers are formed, LiPON as the electrolyte, and stack thickness optimization. These factors each affect transmittance, color, transition speed and cost, as described elsewhere.

The switching speed of an EC device is limited by the sheet resistance of the TCO layers, although voltage drop in the EC layer also contributes to delays. This is because the voltage that can be applied to the device is fixed, and the amount of charge that must be transferred in order to fully color the device scales with the area. Given a series of devices of fixed length, but with progressively larger widths, as the separation between the bus bars gets larger, the impedance of the EC stack itself (the part of the device where the current travels perpendicular to the surface of the glass) gets smaller. In contrast, the impedance of the TCO layers where the current is flowing parallel to the surface of the glass gets larger. Overall, this change in area leads to a larger potential drop in the TCO layers. This results in a lower potential applied directly to the stack, leading to slower switching. Thus, it will be appreciated that to increase the switching speed of reasonably sized devices, e.g., suitable for architectural applications, the conductivity of the TCO layers may be increased.

It is possible to increase the conductivity of the upper TCO by simply making it thicker. However, this approach has certain disadvantages. For example, this approach introduces additional absorption and reflection, thereby reducing the bleached state transmission and decreasing the dynamic range. It also will cause the device to change color asymmetrically, where the color will appear from one of the bus bars and travel across to the other side of the device, resulting in a "curtain" or accordion effect. Still further, this approach adds materials and processing costs, as ITO (which is expensive) typically is used for the TCO.

To overcome these challenges, certain example embodiments use silver-inclusive coating stacks. Such stacks may have sheet resistances at least one order of magnitude lower than those of currently available TCOs. Additional advantages of this coating include its "low-E" functionality, which helps improve SHGC and UV protection of the active layers.

Figure 5:
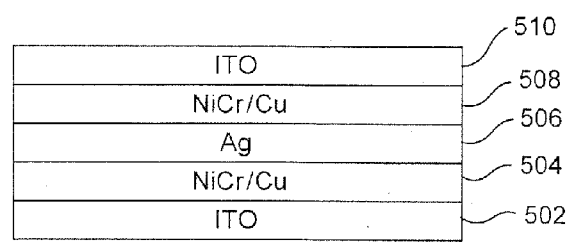
FIG. 5 is an illustrative transparent conductive coating (TCC) usable in connection with certain example embodiments.

FIG. 5 is an illustrative transparent conductive coating (TCC) usable in connection with certain example embodiments. The example TCC of FIG. 5 includes a silver-based layer 506, sandwiched by first and second ITO layers 502 and 510. First and second interlayers 504 and 508 may be provided between the silver-based layer 506 and the first and second ITO layers 502 and 510. Such interlayers may comprise NiCr (e.g., NiCrOx) and/or Cu. The silver-based layer 506 preferably is 100-200 angstroms thick, more preferably 120-180 angstroms thick, and sometimes 140 angstroms thick. Each ITO layer preferably is 1000-2000 angstroms thick, more preferably 1200-1600 angstroms thick, and sometimes about 1400 angstroms thick. The interlayers preferably are 1-20 angstroms thick, more preferably 5-15 angstroms thick, and sometimes 10 angstroms thick. When so designed, it is possible to provide a TCC that has a sheet resistance preferably less than 20 ohms/square, more preferably less than 10 ohms/square, and sometimes as low as 5 ohms/square or even lower. The visible transmission of such layers may be optimized to provide visible transmission of preferably 65%, more preferably 75%, still more preferably 80%, and sometimes as high as 85% or higher. Optionally, low-E coatings may be provided between a glass substrate and the lower-most ITO layer in certain example embodiments. Such low-E coatings may include layers with alternating high and low indexes of refraction, e.g., in a high-low-high-low-high arrangement. Although FIG. 5 shows a simple TCC layer stack, other layer stacks also are possible. In certain example embodiments, a suitable TCC layer stack may include 2, 3, 4, or more of the layer stack shown in FIG. 5.

In certain example embodiments, the TCCs may be graphene- and/or CNT-based. See, for example, U.S. application Ser. Nos. 12/461,349 and 12/659,352, the entire contents of which are hereby incorporated herein.

As indicated above, one issue with current electrochromic devices is the yellowish hue in the clear state and the desired neutral hue in the tinted state. To overcome the challenges, certain example embodiments use "color enhancement" multiple layers, which induce color shifting via Fabry-Perot interference. In certain example embodiments, a color shifting layer stack may be deposited adjacent to the EC coating stack, and it may comprise sputterable insulating and metallic layers. The optical properties as well as thickness of the individual layers may be engineered to provide functionality including, for example, enhanced solar performance, visible color coordinate shifts into a more desirable neutral tone both in the un-tinted and tinted states, and UV screening to the underlying EC stack, thus prolonging its life. In addition, these layers may increase the reliability of the EC window, e.g., by functioning as a barrier for ambient oxidants when and if the seal in the IG unit breaks down. It is also feasible to use the TCC, discussed above to accomplish this functionality.

To reduce the likelihood of diffusion of iron from the glass substrate into the EC device stack and thus reduce the likelihood of degradation, it is possible in certain example embodiments to use a thin barrier layer such as a silicon nitride inclusive (e.g., $Si_3N_4$ or other suitable stoichiometry) layer. However, certain example embodiments may instead use a low Fe, lower cost glass product. The use of a suitable low Fe, lower cost glass substrate may reduce and sometimes even eliminate the need for a barrier layer, thereby leading to a reduction in process complexity, improvement in transparency, and lowering EC manufacturing costs.

The use of LiPON as the IC layer advantageously increases device reliability. For example, reliability is increased at least in terms of life cycle by using the most robust and electrochemically stable electrolyte, (LiPON), which is stable up to 5.5V and against Li metal and whose life cycle in thin film battery application has been demonstrated to be over 100,000 cycles with minimal losses in capacity. Minimal capacity loss for the battery may translate to a reduced shift in optical properties in electrochromics.

Stack thickness may be optimized in certain example embodiments to improve the switching speed of the EC device. For example, one way to improve the EC device speed is to reduce the thickness of the CE and IC layers. The rate of switching has been found to increase with increases in lithium levels. However, it also has been found that if the lithium level is increased too far, the devices become electronically "leaky," thereby failing to become fully colored and also failing to reduce the rate of switching. The stack materials and thickness ranges specified above have been found to be advantageous in terms of improve switching speed, although it is also possible to adjust the thicknesses and materials in other ways in different embodiments.

Example Process integration Techniques

One drawback associated with traditional EC process flows is the need for substrate sizing and tempering before EC device formation, which is related to the fact that post-fabrication tempering will damage the EC device and sizing cannot be performed after tempering. This conventional process flow was illustrated in FIG. 2. In this process, any variation in finished product requirement such as, for example, substrate size, thickness or type, etc., tends to lead to a complex device/layer manufacturing environment. For example, the EC coating process will be fine-tuned to each product separately for optimum results depending on, for example, the substrate size and thickness. For applications such as ECW, with distinct contrast, especially at tinted state, such non-uniformity would be detrimental to the product.

However, as indicated above (e.g., in connection with FIG. 3), certain example embodiments instead involve lamination, a non-tempered single type of glass for EC fabrication, post-EC fabrication glass sizing, and device patterning after blanket deposition of EC layers. From the FIG. 3 schematic and description provided above, it will be appreciated that there is an absence of tempering, along with the inclusion of lamination steps.

In this laminated/bonded EC glass concept, the outer window glass (outer lite) includes a two-sheet glass unit. A first sheet is provided for use as the EC sheet, and the other sheet is provided to meet the tempering/safety and other product requirements. This arrangement is shown in FIGS. 6(*a*) and 6(*b*), which show cross-sectional views for IG units in accordance with certain example embodiments. It will be appreciated from FIGS. 6(*a*) and 6(*b*) that there are at least two options for bonding the EC glass. In the FIG. 6(*a*) example embodiment, the EC stack faces the open inner space, whereas the EC stack is directly bonded to the outer lite in the FIG. 6(*b*) example embodiment. The FIG. 6(*b*) example embodiment is particularly advantageous in that it is perhaps better protected from the breach of IG unit seal. One advantageous consequence of this lamination/bonded concept is that the tempering requirement for the glass used for EC device fabrication can sometimes be completely eliminated. This, in turn, opens the door to using single type substrates and post-fabrication glass sizing with non-tempered glass, consistent and compatible with the current fabrication flows of coated glass and windows. Consequently, this helps lead to a robust and stable production environment for optimal process control, throughput and yield, and to lower cost.

Figure 6A:
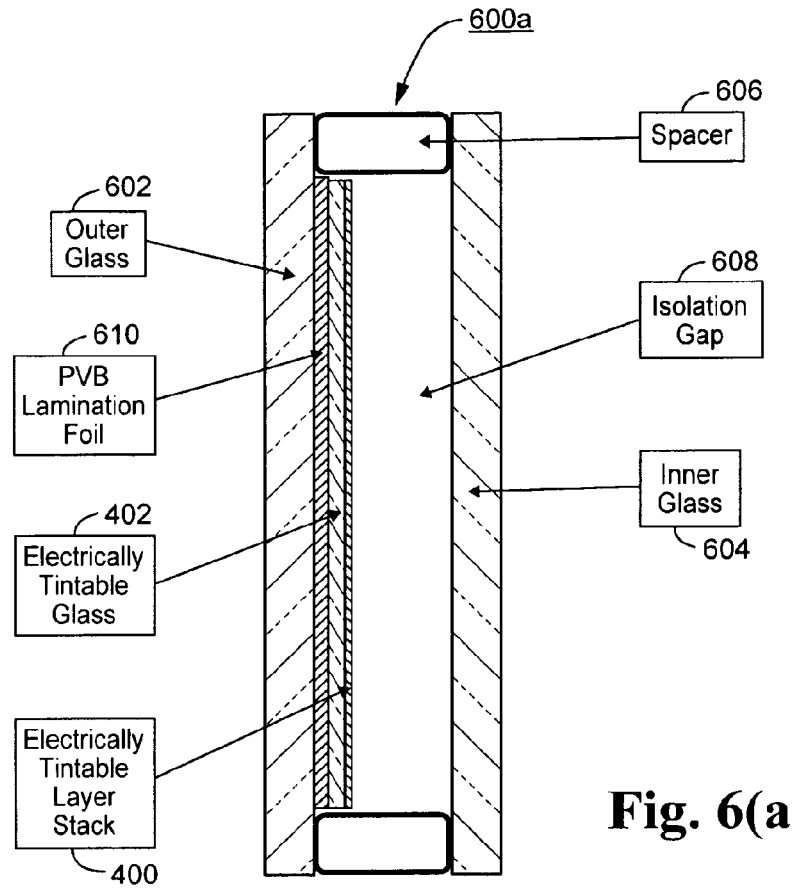
FIG. 6(a) is a first illustrative electrochromic insulating glass (IG) unit in accordance with an example embodiment.
Figure 6B:
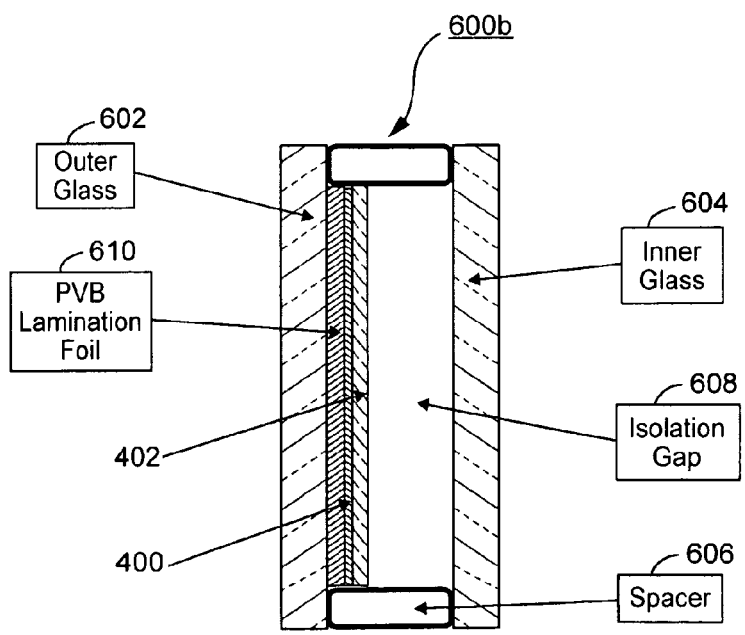
FIG. 6(b) is a second illustrative electrochromic insulating glass (IG) unit in accordance with an example embodiment.

As indicated above, the IG units 600*a* and 600*b* shown in FIGS. 6(*a*) and 6(*b*) are similar to one another. Both include outer glass substrates 602 that may be tempered, along with inner glass substrates 604. These substrates 602 and 604 are substantially parallel to one another and spaced apart, e.g., using spacers 606, thus forming an isolation gap 608. A laminate 610 (e.g., a PVB lamination foil, an EVA laminate, an optibond laminate, etc.) helps connect the outer glass substrate 602 to the EC glass 402. In FIG. 6(a), the laminate 610 connects the outer glass substrate 602 to the EC glass substrate 402 so that the EC layer stack 400 faces the isolation gap 608. By contrast, in FIG. 6(b), the laminate 610 connects outer glass substrate 602 to the EC glass substrate 402 so that the EC layer stack 400 is provided between these two substrates 602 and 402. Some or all of the substrates may be UltraWhite glass substrates, which are commercially available from the assignee of the instant invention.

The integration modification to pattern the device after all EC layers are deposited is another advantage of certain example embodiments, e.g., as compared to the conventional process shown in FIG. 2, where multiple device patterning was needed, e.g., as indicated by the bi-directional arrow. By patterning after all layers are completed, however, the likelihood of defects is reduced, leading to better a yield and better quality ECW. This is related, in part, to the simplified process and the reduced likelihood of cross-contamination issues both the patterning process and additional exposure to (potentially unclean) ambient air.

The EC integration flow that includes lamination, bonding, or other connection of two glass sheets to form a single outer lite of an IG unit, as illustrated in FIGS. 6(a) and 6(b) for example, may lead to additional benefits. For example, such designs have the potential for broadening the product applications, e.g., by flexibly combining the standard EC glass with any another glass product whose properties can be selected to meet the desired window requirements, including safety, color, sound barrier, and others. This process flow is consistent with the current value chain of the glass industry and would help broader the applicable application areas to further amortize the development and cost.

The lamination, bonding, and/or other connection of glass units in certain example embodiments may be similar to those techniques used in both glass (safety products, etc.) and thin-film solar photovoltaic industries. Challenges related to thermal cycling and actual temperature to which the "absorptive" EC device can be subjected may be mitigated, e.g., by selecting the materials so that they match with one another (e.g., in terms of coefficient of thermal expansion, etc.) to help ensure compatibility in potentially harsh environments.

Figure 7:
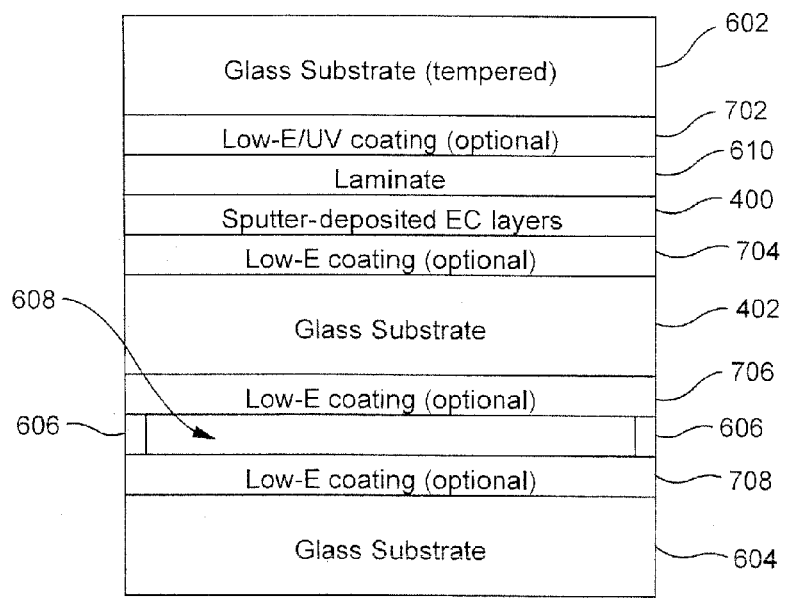
FIG. 7 is a third illustrative electrochromic insulating glass (IG) unit in accordance with an example embodiment.

FIG. 7 is a third illustrative electrochromic insulating glass (IG) unit in accordance with an example embodiment. The FIG. 7 example embodiment is similar to the FIG. 6(b) in that sputter-deposited EC layers 400 are disposed between the outer glass substrate 602 and the mid-lite 402. However, the FIG. 7 example embodiment differs from the FIG. 6(b) example embodiment in that it includes a number of optional low-E coatings. In particular, the FIG. 7 example embodiment includes a first low-E coating 702 located on an inner surface of the outer glass substrate 602, second and third low-E coatings 704 and 706 located on opposing surfaces of the mid-lite 402, and a fourth low-E coating 708 on the surface of the inner substrate 604 facing the air gap 608. One or more of the optional low-E coatings may be the SunGuard SuperNeutral 70 (SN70) low-E coating commercially available from the assignee, although other low-E coatings also may be used. For example, see U.S. Pat. Nos. 7,537,677; 7,455,910; 7,419,725; 7,344,782; 7,314,668; 7,311,975; 7,300,701; 7,229,533; 7,217,461; 7,217,460; and 7,198,851, the disclosures of each of which are hereby incorporated herein by reference.

Example High Throughput Sources and Equipment

Certain example embodiments make EC technology more cost-effective by providing high deposition rate deposition sources to allow high throughput, low capital intensive EC factories. With respect to source development options, the table below identifies possible deposition methods for the EC layers usable in connection with certain example embodiments. There are two basic approaches for the lithiated layers, namely, single step deposition from a composite target or sequential deposition of oxide and lithium. Using highly reactive Li in a manufacturing environment may be problematic. However, using a lithiated target may lead to inconsistency in stoichiometry over the target lifetime, when a sputtering method is used. In any event, for sputtering techniques, certain example embodiments may implement a two-step method. E-beam evaporation methods for lithiated metal oxides also may be used to address potential limitations involved in using the sputtering techniques.

| | Step 1 | | Step 2 | |
|---|---|---|---|---|
| | Target | Sputtering Type | Target | Sputtering Type |
| $Li_xM_yO_z$ | $Li_xM_yO_z$ | pDC or RF in Ar ambient | N/A | N/A |
| $Li_xM_yO_z$ | $M_yO_z$ | pDC or RF in Ar/$O_2$ | Li | Evap or Sputt in Ar |
| $Li_xM_yO_z$ | M | DC or pDC in Ar/$O_2$ | Li | Evap or Sputt in Ar |
| LiPON | $Li_3PO_4$ | RF (in nitrogen ambient) | N/A | N/A |
| $TaO_x$ | $Ta_2O_5$ | pDC or RF in Ar then $O_2$ | N/A | N/A |
| $TaO_x$ | Ta | DC or pDC in $O_2$ | N/A | N/A |

As indicated above, the LiPON electrolyte may be used in certain example embodiments, because of its superior reliability and stability as demonstrated in the thin film battery applications. LiPON is an electrically insulating material (greater than 1E14 Ω-cm), so conventional RF sputtering typically exhibits a low deposition rate (less than 1 μm/hr). Conventional deposition of Li by evaporation is also slow. Accordingly, certain example embodiments may be sped-up so as to be compatible with a high throughput and large area coating system.

Figures 8A, 8B:
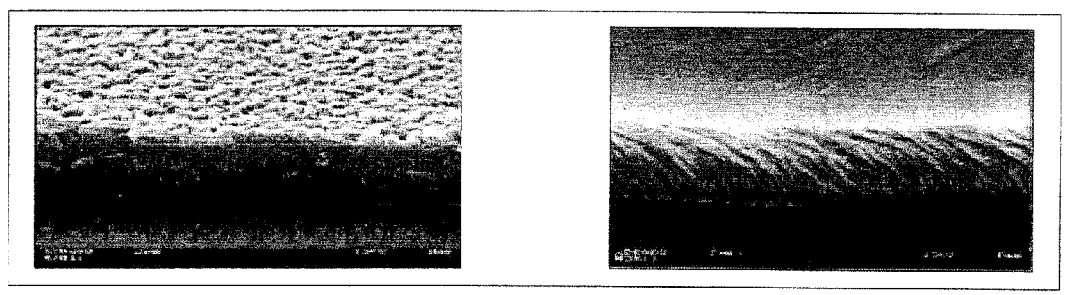
FIG. 8(a) is an SEM image of a 600 nm Al layer deposited by conventional evaporation.
FIG. 8(b) is an SEM image of a 600 nm Al layer deposited using a plasma-activated evaporation in accordance with certain example embodiments.

To overcome at least some of these conventional problems, certain example embodiments may implement a multi-frequency based plasma deposition source, in which higher frequency plasma is superimposed with the common RF power. This may enhance the control of plasma density and sheath voltage. It also may increase the deposition rate, as well as impart energy onto the growing film, e.g., to modulate growth kinetics. This may also affect conformality, morphology, crystallinity, and low pinhole density to yield films with better coating characteristics. This, in turn, will allow the use of thinner electrolytes, leading to higher manufacturing throughput, and lower impedance EC device with faster device switching speeds. FIG. 8(a) is an SEM image of a 600 nm Al layer deposited by conventional evaporation. The image in FIG. 8(a) reveals a columnar structure having a rough surface. FIG. 8(b) is an SEM image of a 600 nm Al layer deposited using a plasma-activated evaporation in accordance with certain example embodiments. That is, FIG. 8(b) shows a multi-plasma sputtering concept for RF-HF combination source. The SEM photograph in FIG. 8(b) shows an example of the effects of imparting energy onto a growing film, which include a denser structure having a smooth surface.

Current Li evaporation technologies generally are not HVM compatible, inasmuch as they typically require the use of multiple point sources and substantial downtime for recharging highly reactive Li or elaborate inert ambient condition to support self feeding from an ex situ source. However, certain example embodiments may incorporate a linear showerhead based source with a remote Li reservoir that can be replenished without disturbing the process or the vacuum system. Modeling results for the proposed evaporators are shown in the table below. From these results, a single linear source appears to be sufficient for an HVM system (greater than 1 μm/min rate).

| T (C.) | Evap. rate (kg/(m² * s)) | Evaporation rate (kg/s) | Static dep. rate (nm/hr) |
|---|---|---|---|
| 300 | 5.12E−08 | 1.01E−10 | 0 |
| 400 | 6.10E−06 | 1.20E−08 | 55 |

-continued

| T (C.) | Evap. rate (kg/(m² * s)) | Evaporation rate (kg/s) | Static dep. rate (nm/hr) |
|---|---|---|---|
| 500 | 2.05E−04 | 4.03E−07 | 1855 |
| 600 | 3.02E−03 | 5.93E−06 | 27330 |

Issues with Li sputtering include "clustering" and low deposition rate, which negatively affect the uniformity. Clustering occurs when the sputtering species is much heavier (e.g., Ar) and the sheath voltage is too high leading to high momentum. Use of lower atomic weight He and Ne will both reduce the deposition rate and incur high cost. Consequently, a multiple-frequency plasma source, analogous to the one proposed for UPON deposition, may be used in certain example embodiments. However, RF may be superimposed upon DC sputtering to increase the plasma density and to reduce the sheath voltage. This will allow the use of lower cost Ar while also reducing clustering.

In terms of HVM development, time savings may be realized in certain example embodiments, as active layers may be processed in a single integrated deposition system where the substrates see only the clean deposition chambers, thereby reducing yield- and aesthetics-affecting defects/debris caused by, for example, patterning, substrate sizing, exposure to air, etc. The limited air exposure also reduces clean-room requirement and once again leads to overall cost reduction.

In certain example embodiments, the EC layer stack process may be sped up at least 2 times compared to current practices, more preferably at least 3 times, and still more preferably at least 5 times. Multiple targets (e.g., 2, 3, 4, or even 5 or more targets) may be used in the deposition process to increase line speed.

Example Electrochromic IG Unit

An example EC IG unit includes a tempered outer substrate, a mid-lite, and an inner substrate. The outer substrate is a 6 mm thick UltraWhite substrate, and the mid-lite is a 1 mm thick UltraWhite substrate. The outer substrate and the mid-lite are bonded together using an optibond laminate. Electrochromic layers are disposed on the surface of the mid-lite that face the outer substrate. The TCCs used in connection with the electrochromic layers correspond to the FIG. 5 example layer stack. A SunGuard SuperNeutral 70 low-E coating commercially available from the assignee is formed on both sides of the electrochromic layers. The inner substrate is a 6 mm thick sheet of Clear glass, commercially available from the assignee. An air gap of 12 mm is present between the mid-light and the inner substrate. This arrangement may have the following example properties:

| | | Visible Light | | Solar Energy (Direct) | | Winter | | Summer | | | |
|---|---|---|---|---|---|---|---|---|---|---|---|
| | | | % Reflectance | | % R | U-value | U-value | Shading | | | |
| Condition | % T | Indoor | Outdoor | % T | Out | Night | Day | Coef. | SHGC | RHG | LSG |
| Untinted LiPON | 48 | 15 | 18 | 15 | 43 | .291 | .28 | .22 | .35 | 49 | 2.03 |
| Tinted LiPON | 2 | 11 | 9 | 1 | 40 | .291 | .28 | .07 | .062 | 17 | .36 |

As is known, LSG stands for light-to-solar gain. In the table above, "% R Out" refers to the percent of direct solar energy reflected out.

In certain example embodiments, transmission in the tinted state preferably is less than 5%, more preferably less than 4%, still more preferably less than 3%, and sometimes even about 2%. In certain example embodiments, transmission in the untinted state preferably is at least about 40%, more preferably at least about 45%, and sometimes 48% or even higher. SHGC preferably ranges from 0.03 to 0.5.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An electrochromic assembly, comprising:
  at least first and second glass substrates, the first and second substrates being substantially parallel to and spaced apart from one another; and
  a plurality of sputter deposited device layers supported by the first substrate, the plurality of device layers comprising, in order moving away from the first substrate, a first transparent conductive coating, a doped and anodically coloring counter electrode layer, an ion conductor layer, a doped electrochromic layer comprising WOx, and a second transparent conductive coating, wherein the first and second substrates are laminated to one another, and wherein the second substrate is heat treated and the first substrate is not heat treated.

2. The assembly of claim 1, wherein the counter electrode and electrochromic layers are doped with Mg.

3. The assembly of claim 1, wherein the WOx is substoichiometric.

4. The assembly of claim 1, wherein the counter electrode and electrochromic layers are both color changeable when the electrochromic assembly is in operation.

5. The assembly of claim 1, wherein the device layers face away from the second substrate.

6. The assembly of claim 1, wherein the device layers face the second substrate.

7. The assembly of claim 1, wherein each said transparent conductive coating includes a layer comprising silver sandwiched between layers comprising indium tin oxide, and further wherein layers including Ni, Cr, and/or Cu are provided between each said layer comprising silver and each said layer comprising indium tin oxide.

8. The assembly of claim 1, wherein the first substrate is cut from a stock sheet of coated non-tempered glass.

9. The assembly of claim 1, wherein the counter electrode and electrochromic layers are both electrochromic color changing layers such that, in operation, the counter electrode layer becomes transparent upon insertion of ions therein and changes to a first desired color upon the loss of ions therefrom, the counter electrode layer becomes transparent upon the loss of ions therefrom and changes to a second desired color upon insertion of ions therein.

10. The assembly of claim 1, wherein the counter electrode and electrochromic layers each are doped with Mg, and the WOx is sub-stoichiometric.

11. The assembly of claim 1, wherein:

the counter electrode and electrochromic layers are both electrochromic color changing layers such that, in operation, the counter electrode layer becomes transparent upon insertion of ions therein and changes to a first desired color upon the loss of ions therefrom, the counter electrode layer becomes transparent upon the loss of ions therefrom and changes to a second desired color upon insertion of ions therein, the first substrate is cut from a stock sheet of coated non-tempered glass, the first and second substrates are laminated to one another via a polymer-based interlayer, and the device layers face away from the second substrate.

12. The assembly of claim 1, wherein the ion conductor layer comprises LiNiO.

13. The assembly of claim 12, wherein the ion conductor layer has a nanocrystalline morphology.

14. The assembly of claim 1, wherein the ion conductor layer includes Li.

15. The assembly of claim 14, wherein the ion conductor layer includes LiPON.

16. The assembly of claim 15, wherein the ion conductor layer is deposited using a using a multi-frequency radio frequency-high frequency based plasma deposition source in which higher frequency plasma is superimposed on radio frequency power.

17. The assembly of claim 15, wherein the ion conductor layer is about 1-3 microns thick.

18. The assembly of claim 15, wherein the WOx is sub-stoichiometric, where $2.6<x<3$.

19. The assembly of claim 18, wherein at least of the counter electrode, ion conductor, and electrochromic layers is doped with Mg.

20. The assembly of claim 19, wherein at least the ion conductor layer is doped with Mg.

* * * * *